United States Patent [19]

Elliott, Jr. et al.

[11] Patent Number: 5,261,757
[45] Date of Patent: Nov. 16, 1993

[54] SHAFT MOUNT FOR DATA COUPLER SYSTEM

[75] Inventors: James R. Elliott, Jr.; Mark T. Lord, both of Yorktown, Va.

[73] Assignee: The United States of America as represented by the Administrator of the National Aeronautics and Space Administration, Washington, D.C.

[21] Appl. No.: 770,509

[22] Filed: Oct. 3, 1991

[51] Int. Cl.⁵ .................................. F16B 3/06
[52] U.S. Cl. ........................... 403/344; 403/24; 403/27; 403/6; 416/61
[58] Field of Search .............. 403/344, 373, 309, 310, 403/311–313, 27, 6, 24, 410; 73/855, 862.338, 862.044, 862.045, 862.627; 33/DIG. 13; 416/61

[56] References Cited

U.S. PATENT DOCUMENTS

| 843,906 | 2/1907 | Murchie | 403/344 |
|---|---|---|---|
| 2,228,282 | 1/1941 | Miller | 403/371 |
| 3,561,263 | 2/1971 | Ward et al. | 73/862.045 |
| 3,588,152 | 6/1971 | Shomo | 403/344 |
| 4,525,025 | 6/1985 | Hohmann et al. | 350/96.15 |
| 4,529,986 | 7/1985 | d'Auria et al. | 343/433 |
| 4,537,526 | 8/1985 | Hartl | 403/370 |
| 4,668,115 | 5/1987 | Ferris et al. | 403/24 |
| 4,711,516 | 12/1987 | Graber | 350/96.15 |
| 4,723,053 | 2/1988 | Amaya | 174/41 |
| 5,006,007 | 4/1991 | Fischer et al. | 403/373 X |
| 5,062,734 | 11/1991 | Vanzee et al. | 403/309 X |

FOREIGN PATENT DOCUMENTS

| 143826 | 9/1980 | Fed. Rep. of Germany | 73/862.338 |
|---|---|---|---|
| 3528364 | 2/1987 | Fed. Rep. of Germany | 73/862.338 |
| 56-79222 | 6/1981 | Japan | 73/862.044 |
| 1381946 | 1/1975 | United Kingdom | 73/862.045 |

Primary Examiner—Randolph A. Reese
Assistant Examiner—Harry C. Kim
Attorney, Agent, or Firm—Kevin B. Osborne; Kimberly A. Chasteen

[57] ABSTRACT

A device for mounting a data transmission apparatus to a rotating, tapered and instrumented shaft is provided. This device permits attachment without interfering with shaft rotation or the accuracy of data output, and prevents both radial and axial slippage of the data transmission apparatus. The mounting device consists of a sleeve assembly which is attached to the shaft with clamps that are situated at some distance removed from the instrumented area of the shaft. The data transmission device is secured to the sleeve such that the entire assembly rotates with the shaft. Shim adjustments between sleeve sections assure that a minimum compressive load is transferred to the instrumented area of the shaft and a rubber lining is affixed to a large portion of the interior surface of the sleeve to absorb vibration.

9 Claims, 2 Drawing Sheets

SHAFT MOUNT FOR DATA COUPLER SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates generally to a shaft mounting mechanism and more particularly to a shaft mounting mechanism for attachment of a data transmission device to a tapered, rotating and instrumented shaft.

2. Description of the Related Art

Data transmission between rotating and stationary transmission points is conventionally achieved by attaching an electromechanical slip ring to a rotating member such as a shaft. The slip ring has channels contacting respective brushes fixed to a stationary component, thereby providing a continuous electrical connection between rotating and stationary components. Slip rings are used in a wide range of applications from radar antennae to nearly every type of electric rotating machinery.

These brushes often wear out from the friction encountered during use, causing a failure of the contact. Also, the period preceding complete failure is marked by intermittent losses of contact. In addition, specific strain gage applications require a low background noise environment which does not exceed a few microvolts.

Data transmission devices, such as the Model 1200B Series Universal Data Coupler System, which is commercially available from the Wireless Data Corporation of Mountain View, Calif., operate without the need for direct contact of the transmission device with the instrumented surface of the shaft. However, attachment of such devices to tapered, rotating shafts of helicopter tail rotors for the purpose of measuring strain gage output has been difficult since there are no adequate internal or external means for securing the apparatus to prevent radial or axial slippage when attached to a tapered shaft. In addition, any attachment method must minimize the introduction of loads which might affect the accuracy of strain gage readings from the instrumented surface of the shaft.

OBJECTS OF THE INVENTION

It is accordingly an object of this invention to provide a device for securely mounting a data transmission apparatus to a rotating, tapered and instrumented shaft.

It is another object of the present invention to achieve the foregoing object in a strain gage application.

It is a further object of the present invention to accomplish the foregoing objects to permit accurate strain measurements of a rotor shaft.

It is yet another object of the present invention to accomplish these strain measurements on the rotor shaft of a helicopter tail rotor.

Additional objects and advantages of the present invention are apparent by the drawings and specifications which follow.

SUMMARY OF THE INVENTION

The present invention overcomes the problem of attachment of a data transmission apparatus to a rotating, tapered and instrumented shaft without the introduction of stresses which would interfere with accurate strain gage outputs. This is accomplished by tapering the shaft mounting mechanism, which includes shaft sleeves and shaft clamps, to match the shaft taper. Spacers are also incorporated in the shaft sleeves to assure the sleeve makes minimal contact the shaft surface and does not impart loads which could interfere with accurate strain gage outputs. The interior surface of a large portion of the sleeve is bonded with rubber to absorb vibration. Therefore, the mounting mechanism securely supports the data transmission apparatus on the rotating shaft without introducing loads that interfere with accurate strain gage outputs from the instrumented shaft surface.

DESCRIPTION OF THE PREFERRED EMBODIMENTS

Figure 1:
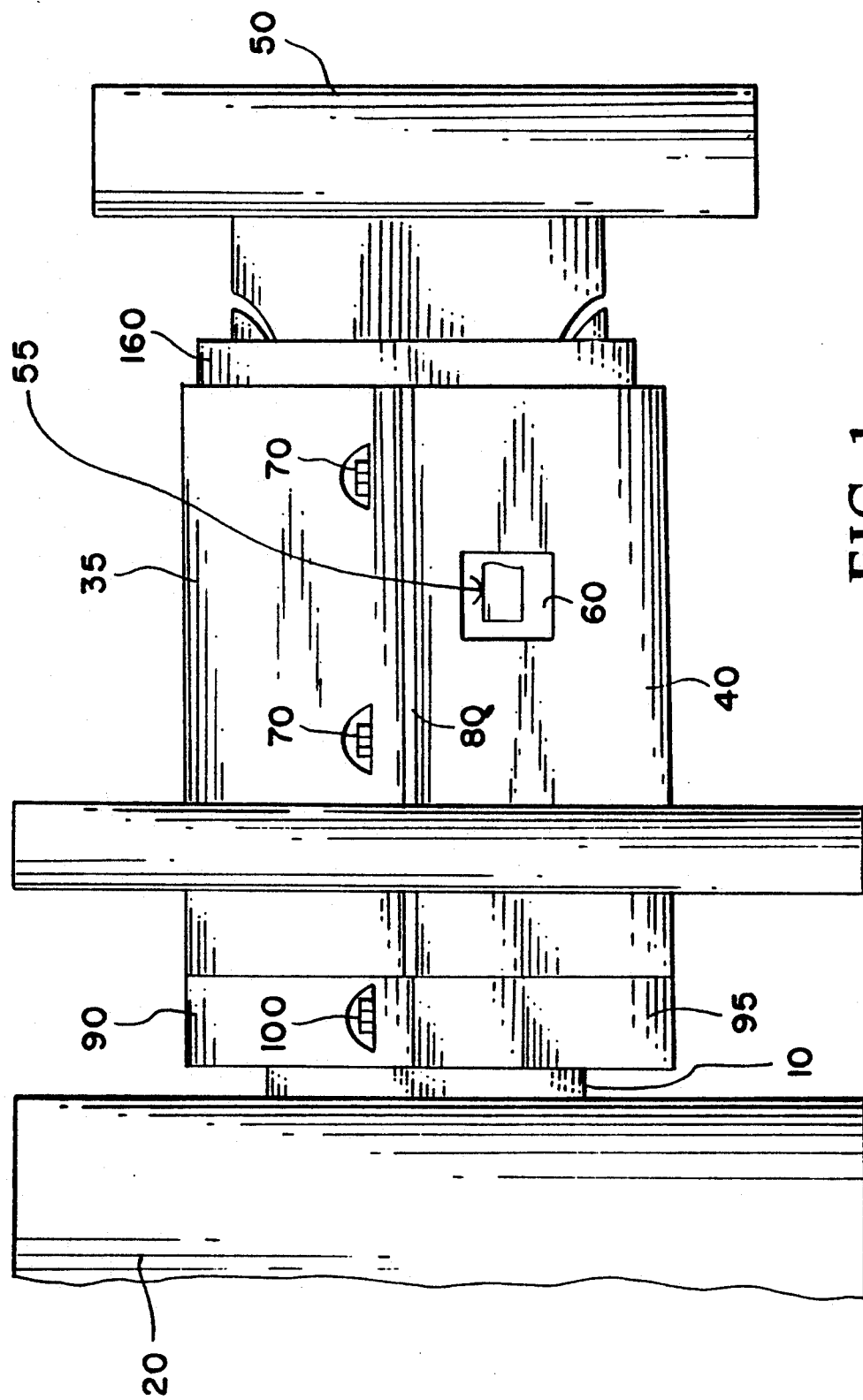
FIG. 1 is a view of the mounting mechanism, with a data transmission apparatus, attached to a tapered tail rotor shaft of a helicopter tail rotor.

Referring to FIG. 1, an embodiment of the present invention is shown in the specific application of strain gage testing of a helicopter tail rotor shaft 10 which is rotatingly coupled to a 90 degree gear box 20. Two shaft sleeves 35 and 40 are provided which are situated on the rotor shaft 10 between the gear box 20 and a tail rotor blade hub 50 and are approximately the length of the shaft 10. Each shaft sleeve is semi-circular and mates with the other shaft sleeve to encircle shaft 10. Each shaft sleeve 35 and 40 has an appropriate instrumentation opening 60 to facilitate the attachment of appropriate test instruments 55 such as strain gages (not shown) to the shaft surface 10. The interior surface of the sleeves 35 and 40 are tapered to match the taper of the tail rotor shaft 10. The shaft sleeves 35 and 40 are secured to each other via appropriate screws 70. The inner diameter of the shaft sleeves 35 and 40 is adjusted with shims 80 placed between the mating surfaces of the shaft sleeves 35 and 40.

Figure 2:
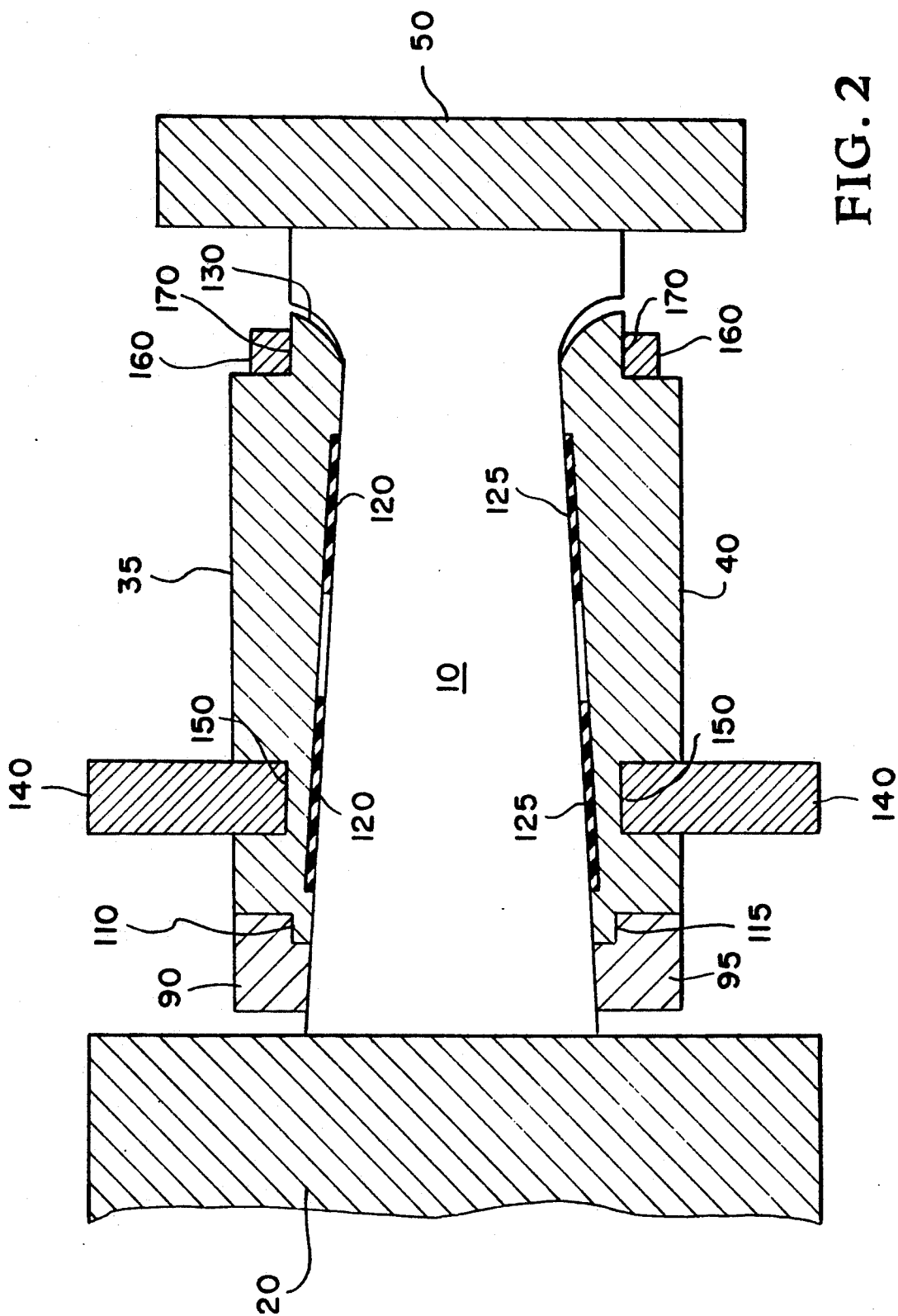
FIG. 2 is a cutaway view of the mounting mechanism, with a data transmission apparatus, attached to a tapered tail rotor shaft of a helicopter tail rotor.

Referring to FIG. 2, two identical shaft clamps 90 and 95 are provided. Each shaft clamp is semi-circular and mates with the other shaft clamp to encircle and maintain compressive contact with the shaft 10. The shaft clamps 90 and 95 are secured to each other via oppositely located sets of appropriate screws 100. Tightening of the shaft clamp screws 100 causes the shaft clamps 90 and 95 to remain in compressive contact with the shaft 10. The shaft clamps 90 and 95 have depressions or slots which are keyed to inserts 110 and 115 in the ends of the shaft sleeves 35 and 40 at the end of the sleeve located adjacent to the gear box 20 and away from the instrumentation openings 60. Location of the shaft clamps 90 and 95 away from the instrumentation openings 60 results in accurate strain gage output since the compressive loads introduced due to clamps 90 and 95 are removed from the area of the strain gage attachment 55. The interior surfaces of the sleeves 35 and 40 have a rubber lining 120 and 125 attached to absorb vibration. The rubber lining 120 and 125 is omitted, i.e., defines a gap, along the circumferential portion of the sleeves 35 and 40 that coincide with the instrumented areas of the shaft 55 located beneath openings 60. In addition, the end of the sleeves 35 and 40 located adjacent to the tail rotor blade hub 50 has a curvature 130 which matches that of the shaft 10 as the shaft transitions to the tail rotor blade hub 50. This curvature prevents axial slippage of the sleeves 35 and 40 in the direction of the tail rotor blade hub 50.

A data transmission apparatus 140 for measuring and conveying strain gage output without the need for direct contact with the instrument area is securely seated in and keyed (not shown) to a first annular grooved channel 150 which encircles the mated shaft sleeves 35 and 40 and is located between the clamps 90 and 95 and the instrumentation openings 60. This data transmission apparatus 140 may be any known apparatus such as the Model 1200B Series Universal Data Coupler System which is commercially available from the Wireless Data Corporation of Mountain View, Calif.

At the end of the sleeves 35 and 40, located adjacent to the tail rotor blade hub 50, a retainer ring 160 is seated in a second annular grooved channel 170 which encircles the outer circumference of the sleeves. The retainer ring 160 has appropriate tightening means such as set screws (not shown) to provide radially compressive force to the outer surface of the sleeves 35 and 40. This compressive force acts to prevent separation of the sleeves 35 and 40 and also imparts a compressive load to the shaft 10 to secure the entire assembly. Location of the retainer ring 160 at the end of the assembly adjacent to the tail rotor blade hub 50 ensures that compressive loads imparted to the shaft 10 by the ring 160 will be far enough away from the instrumented areas 55 to prevent interference with strain gage outputs.

Many modifications, improvements and substitutions will be apparent to the skilled artisan without departing from the spirit and scope of the present invention as described in the specification and defined in the following claims.

What is claimed is:

1. A device for securely mounting a data transmission apparatus to a rotating, tapered shaft having an instrumented area located thereon, the data transmission apparatus measuring and conveying an output from the instrument area, the device comprising:
   (a) a pair of shaft sleeves which encircle the shaft, each sleeve being semi-circular and mating with the other shaft sleeve, interior surfaces of said sleeves only contacting the shaft surface for a length at first ends of said sleeves at a distance removed from the instrumented area of the shaft, the first ends of said sleeves having axial protrusions, and each of said shaft sleeves defining an opening to allow access to the instrumented area of the shaft;
   (b) a pair of clamp half sections, respectively located a distance removed from the instrumented area of the shaft at the first end of each said sleeve, said clamp sections compressively encircling the shaft and containing depressions which mate with the axial protrusions of said sleeves, whereby the sleeves and clamp sections move in unison;
   (c) means for attaching the data transmission apparatus to the exterior surface of at least one of the shaft sleeves.

2. The device of claim 1 further comprising a first annular grooved channel which encircles the outer surfaces of said shaft sleeves and lies between said clamps and said instrumentation openings in said shaft sleeves, whereby the data transmission apparatus is securely seated in said first annular grooved channel.

3. The device of claim 2 further comprising shims placed between the mated surfaces of said sleeves to minimize compressive load transmission to the shaft surface by effectively adjusting the inner diameter of said sleeves.

4. The device of claim 3 wherein a respective rubber layer is affixed to a portion of the inner surfaces of the sleeves in order to absorb vibration.

5. The device of claim 4 wherein the rubber layers are not affixed to the portions of the sleeve inner surfaces facing the instrumented area of the shaft.

6. The device of claim 4, wherein each rubber layer has a gap corresponding to the oppositely located instrumented area of the shaft.

7. The device of claim 4 wherein a retainer ring capable of imparting radially compressive stress is circumferentially positioned on the outer surface of the sleeves at a second end of said sleeves opposite to the location of the clamps.

8. The device of claim 7 wherein said retainer ring is seated in a second annular groove defined in the outer surfaces of the shaft sleeves.

9. A method for mounting a data transmission apparatus on a rotating, tapered shaft having an instrumented area located thereon, wherein the data transmission apparatus conveys measurements from the shaft instrumented area, the method comprising the steps of:
   (a) positioning a pair of shaft sleeves around the shaft each sleeve being semi-circular and mating with the other shaft sleeve, wherein a portion of the interior surface of first ends of said sleeves at a distance removed from the instrumented area of the shaft is in compressive contact with the exterior surface of the shaft, the first ends of said sleeves having an axial protrusions, and each of said shaft sleeves defining an opening to allow access to the instrumented area of the shaft;
   (b) locating a pair of clamp half sections at a distance removed from the instrumented area of the shaft at the first end of each said sleeve, said clamp sections compressively encircling the shaft and containing depressions which mate with the axial protrusions of said sleeves whereby the sleeves and clamp sections move in unison; and
   (c) fixedly mounting the data transmission apparatus to the exterior surface of at least one of the shaft sleeves whereby, the data transmission apparatus rotates in unison with the sleeve assembly and the shaft.

* * * * *